(12) United States Patent
Schmidt et al.

(10) Patent No.: US 12,449,781 B2
(45) Date of Patent: Oct. 21, 2025

(54) METHOD FOR GENERATING A PROCESS MODEL

(71) Applicant: ABB Schweiz AG, Baden (CH)

(72) Inventors: Benedikt Schmidt, Heidelberg (DE); Marcel Dix, Mannheim (DE); Martin Hollender, Dossenheim (DE); Andrew Cohen, Ludwigshafen am Rhein (DE); Arzam Muzaffar Kotriwala, Ladenburg (DE); Marco Gaertler, Dossenheim (DE); Sylvia Maczey, Hirschberg (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 421 days.

(21) Appl. No.: 17/977,355

(22) Filed: Oct. 31, 2022

(65) Prior Publication Data

US 2023/0050321 A1  Feb. 16, 2023

Related U.S. Application Data

(63) Continuation of application No. PCT/EP2021/060186, filed on Apr. 20, 2021.

(30) Foreign Application Priority Data

Apr. 30, 2020 (EP) .................................. 20172401

(51) Int. Cl.
  *G05B 19/042* (2006.01)
(52) U.S. Cl.
  CPC .............. *G05B 19/0428* (2013.01); *G05B 2219/14009* (2013.01)
(58) Field of Classification Search
  CPC . G05B 19/41885; G05B 13/04; G05B 13/048
  (Continued)

(56) References Cited

U.S. PATENT DOCUMENTS

2010/0223570 A1  9/2010  Gerstl et al.
2014/0074712 A1  3/2014  Palmer et al.

FOREIGN PATENT DOCUMENTS

CN  101213580 A  7/2008
CN  102631828 A  8/2012
(Continued)

OTHER PUBLICATIONS

European Patent Office, International Search Report in International Patent Application No. PCT/EP2021/060186, 3 pp. (Jun. 28, 2021).
(Continued)

*Primary Examiner* — Ronald D Hartman, Jr.
(74) *Attorney, Agent, or Firm* — Leydig, Voit & Mayer, Ltd.

(57) ABSTRACT

A method for generating a process model modeling a manual mode procedure instance of a plant process includes providing log events of operational actions; selecting related sequences of manual mode operational actions from the log events; filtering the related sequences according to an individual plant section; identifying a sequential order from the filtered related sequences; determining statistical properties of values of related process variables and/or statistical properties of values of related set point changes to each sequential ordered manual mode operational action from the filtered related sequences; generating the process model of the manual mode procedure instance by arranging related manual mode operational actions with the sequential order of each operational action assigned with the statistical properties of the values of related process variables and/or assigned with the statistical properties of the values of the related set point changes.

11 Claims, 6 Drawing Sheets

(58) Field of Classification Search
USPC .......................................................... 700/79
See application file for complete search history.

(56) References Cited

FOREIGN PATENT DOCUMENTS

| | | |
|---|---|---|
| CN | 106209893 A | 12/2016 |
| TW | 201106279 A | 2/2011 |
| TW | 201826218 A | 7/2018 |
| TW | 202013268 A | 4/2020 |
| WO | WO 94/03847 A1 | 2/1994 |
| WO | WO 2012/048734 A1 | 4/2012 |
| WO | WO 2018/226436 A1 | 12/2018 |

OTHER PUBLICATIONS

European Patent Office, Written Opinion in International Patent Application No. PCT/EP2021/060186, 5 pp. (Jun. 28, 2021).

FIG. 1

| Procedure Instance 1 Start = 2019-12-04 9:08:00 End = 2019-12-04 9:16:30 | | |
|---|---|---|
| Time | Event | Level Value |
| 2019-12-04 9:08:00 | Closing Valve A | 0% |
| 2019-12-04 9:08:02 | Valve A = 0 | 0% |
| 2019-12-04 9:08:15 | Closing Valve B | 0% |
| 2019-12-04 9:08:17 | Valve B = 0 | 0% |
| 2019-12-04 9:08:30 | Closing Valve C | 0% |
| 2019-12-04 9:08:31 | Valve C = 1 | 0% |
| 2019-12-04 9:09:01 | Start pump D | 0% |
| 2019-12-04 9:09:02 | Pump = 1 | 1% |
| 2019-12-04 9:09:30 | Flow = 100 | 2% |
| 2019-12-04 9:15:21 | Flow = 80 | 50% |
| 2019-12-04 9:15:37 | Stop pump D | 80% |
| 2019-12-04 9:15:42 | Pump D = 0 | 80% |
| 2019-12-04 9:16:01 | Closing Valve C | 80% |
| 2019-12-04 9:16:02 | Valve C = 0 | 80% |

| Procedure Instance 2 Start = 2019-17-04 13:15:32 End = 2019-17-04 13:24:12 | | |
|---|---|---|
| Time | Event | Level Value |
| 2019-17-04 13:15:32 | Closing Valve B | 0% |
| 2019-17-04 13:15:32 | Valve B = 0 | 0% |
| 2019-17-04 13:15:47 | Closing Valve A | 0% |
| 2019-17-04 13:15:49 | Valve A = 0 | 0% |
| 2019-17-04 13:16:02 | Open Valve C | 0% |
| 2019-17-04 13:16:01 | Valve C = 1 | 0% |
| 2019-17-04 13:16:12 | Start pump D | 0% |
| 2019-17-04 13:16:13 | Pump = 1 | 1% |
| 2019-17-04 13:16:22 | Flow = 100 | 2% |
| 2019-17-04 13:23:30 | Flow = 80 | 50% |
| 2019-17-04 13:23:45 | Flow = 20 | 80% |
| 2019-17-04 13:24:03 | Stop pump D | 80% |
| 2019-17-04 13:24:05 | Pump D = 0 | 80% |
| 2019-17-04 13:24:11 | Closing Valve C | 80% |
| 2019-17-04 13:24:12 | Valve C = 0 | 80% |

FIG. 3a

Procedure Instance 1

| Event | Level Value | ID | # |
|---|---|---|---|
| Closing Valve B | 0% | CA | 1 |
| Valve B = 0 | 0% | | |
| Closing Valve A | 0% | CB | 1 |
| Valve A = 0 | 0% | | |
| Open Valve C | 0% | CC | 1 |
| Valve C = 1 | 0% | | |
| Start pump D | 0% | StaD | 1 |
| Pump = 1 | 1% | | |
| Flow = 100 | 2% | FU | 1 |
| Flow = 80 | 50% | FD | 1 |
| Stop pump D | 80% | StoD | 1 |
| Pump D = 0 | 80% | | |
| Closing Valve C | 80% | CC | 1 |
| Valve C = 0 | 80% | | |

Procedure Instance 2

| Event | Level Value | ID | # |
|---|---|---|---|
| Closing Valve B | 0% | CA | 1 |
| Valve B = 0 | 0% | | |
| Closing Valve A | 0% | CB | 1 |
| Valve A = 0 | 0% | | |
| Open Valve C | 0% | OC | 1 |
| Valve C = 1 | 0% | | |
| Start pump D | 0% | StaD | 1 |
| Pump = 1 | 1% | | |
| Flow = 100 | 2% | FU | 1 |
| Flow = 80 | 50% | FD | 1 |
| Flow = 20 | 69% | FD | 2 |
| Stop pump D | 80% | StoD | 1 |
| Pump D = 0 | 80% | | |
| Closing Valve C | 80% | CC | 1 |
| Valve C = 0 | 80% | | |

METHOD FOR GENERATING A PROCESS MODEL

CROSS-REFERENCE TO RELATED APPLICATIONS

This patent application claims priority to International Patent Application No. PCT/EP2021/060186, filed on Apr. 20, 2021, and to European Patent Application No. 20172401.0, filed on Apr. 30, 2020, each of which is incorporated herein in its entirety by reference.

FIELD OF THE DISCLOSURE

The present disclosure relates to a method for generating a process model modeling a plurality of manual mode procedure instances of a plant process.

BACKGROUND OF THE INVENTION

In plant operation, very often certain procedure instances related to plants like start-up or shut-down of equipment, emptying tanks, etc. are executed in the operator room manually. According to the state of the art, special operator displays are provided to the operators or event batch recipe systems are provided to enforce a reliable execution of manual procedure instances. Very often, such efforts to guide the operator are not sufficient and the quality of the execution solely depends on the experience, diligence and current mental state of the operator.

BRIEF SUMMARY OF THE INVENTION

The present disclosure describes a method for generating a process model, a method to generate a recommended set point, a method for generation of a warning signal, a support system, a use of the generated process model, a computer program, and a computer-readable storage medium with subject matter as described in the independent claims.

In one embodiment, a method to generate a workflow model as a process model for manual mode procedure instances is described, wherein by mining historical resp. past log data knowledge from manual sequences of operational actions performed by an operator is learnt.

The idea underlying the invention is to record operator actions during a plurality of operational procedures or extract such operator actions and the related knowledge from past event logs. The recorded procedures, i.e. the procedure instances, will be translated in a process model that can be used to guide operators through the execution of each of the corresponding procedure instance and/or monitor or check the execution of the procedure in accordance with the specified rules by the process model.

In one general aspect, there is provided a method for generating a process model modeling a manual mode procedure instance of a plant process, the procedure instance comprising a related sequence of operational actions, including the following steps.

At a step of the method a plurality of log events of a plurality of operational actions of the plant process is provided. Another step of the method selects a plurality of related sequences of manual mode operational actions from the plurality of log events. Another step of the method filters the plurality of related sequences of manual mode operational actions according to an individual plant section.

Another step of the method identifies a sequential order from the plurality of filtered related sequences of the manual mode operational actions.

Another step of the method determines statistical properties of values of related process variables and/or statistical properties of values of related set point changes to each sequential ordered manual mode operational action from the plurality of filtered related sequences of the manual mode operational actions.

Another step of the method generates the process model of the manual mode procedure instance by arranging related manual mode operational actions with the sequential order and each operational action is assigned with the statistical properties of the values of related process variables and/or the statistical properties of the values of the related set point changes.

In another aspect, the disclosure describes a method for recording operator actions during operational procedures or extract such operator actions from historical respectively past event logs. The recorded procedures, named procedure instances, are translated in a process model that may be used to guide operators through the execution of the corresponding manual procedures and monitor their compliance to the related rules defined by a simple waterfall process model.

In this context, manual mode operational actions are operational actions which are performed by a human operator versus a control loop of an automatically controlled system.

DETAILED DESCRIPTION OF THE INVENTION

Figure 1:
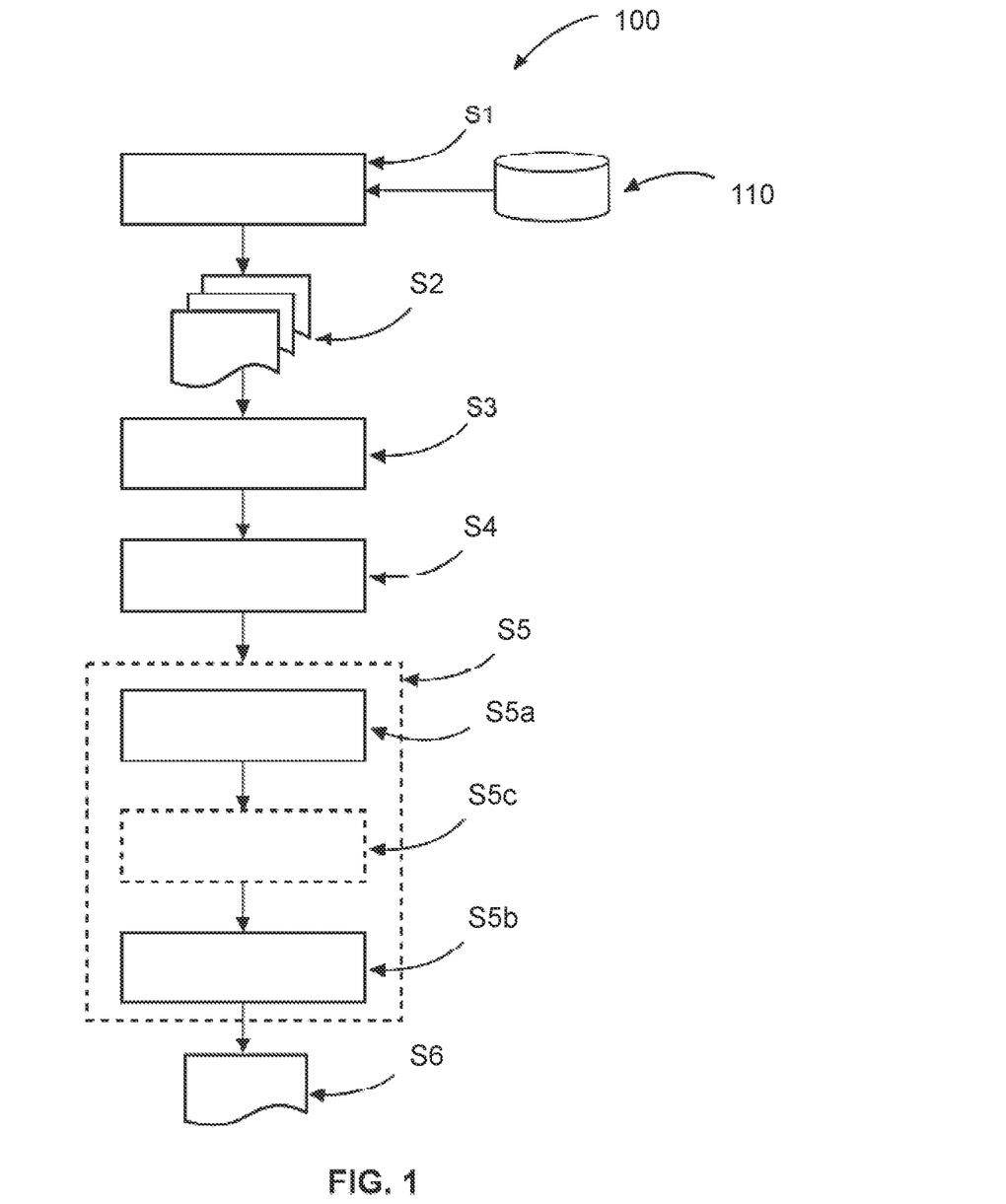
FIG. 1 is a flowchart for a method for generating a process model in accordance with the disclosure.

FIG. 1 sketches schematically an overview of the method 100 for generating a process model modeling a manual mode procedure instance of a plant process, wherein the procedure instances comprise a related sequence of operational actions.

In a first step S1 a plurality of log events of a plurality of operational actions of the plant process may be provided for instance by the control system log file 110.

From this plurality of log events a plurality of related sequences of manual mode operational actions are selected in another step S2.

The plurality of related sequences of manual mode operational actions according to an individual plant section is filtered in a further step S3.

In a further step S4, a sequential order is identified from the plurality of filtered related sequences of the manual mode operational actions.

Statistical properties of values of related process variables and/or statistical properties of values of related set point changes to each sequential ordered manual mode operational action is determined from the plurality of filtered related sequences of the manual mode operational actions in a further step S5.

This step may comprise the step of determining statistical properties of values of related process variables S5a as well as the step of determining statistical properties of values of related set point changes S5b as well as a method step S5c, wherein in the method step the set point, for e.g., recommending a set point to the operator is determined using a machine learning model by means of the plurality of related set points related to an individual plant condition, to be assigned to the related manual mode operational action in respect to the individual plant condition.

The statistical properties may characterize recorded upper and lower bounds of set point choices from the manual mode procedure instance as logged by the plurality of operational actions.

The process model of the manual mode procedure instance is generated by arranging related manual mode operational actions with the sequential order and each operational action is assigned with the statistical properties of the values of related process variables and/or the statistical properties of the values of the related set point changes in step S6.

Figure 2A:
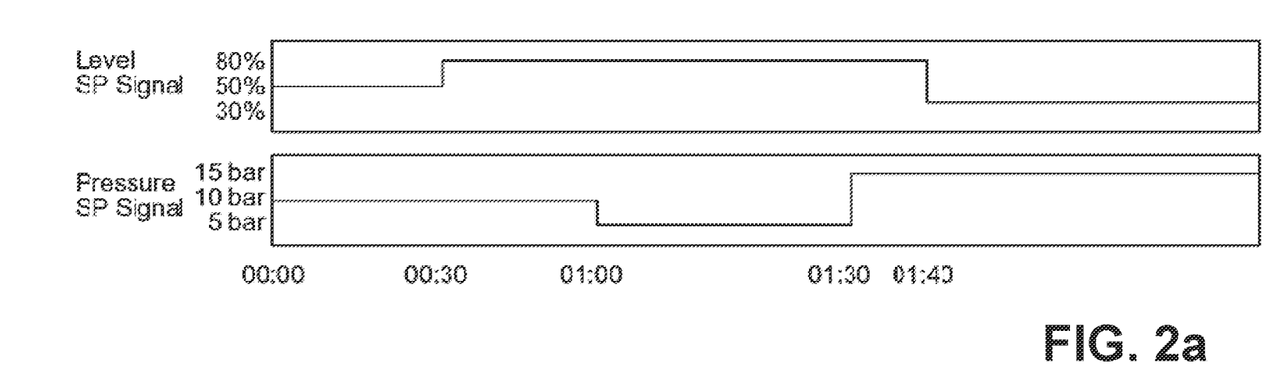
FIG. 2a is a time series of values of process variables and related log file entries in accordance with the disclosure.
Figure 2B:
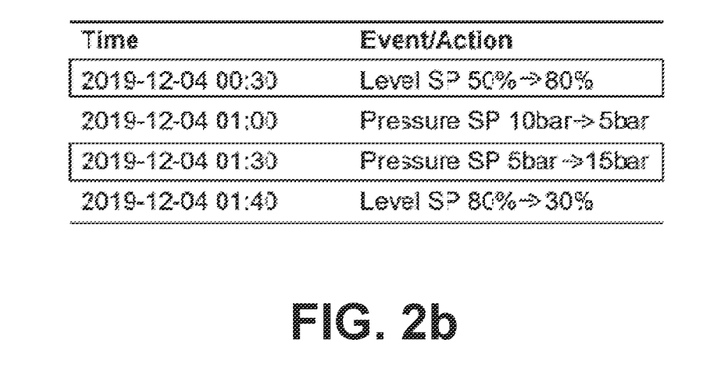
FIG. 2b is another time series of values of process variables and related log file entries in accordance with the disclosure.

FIG. 2a sketches as an example a first time series 210 and a second time series 220 of values of process variables A (filling level) respectively B (pressure) and FIG. 2b sketches examples of related of log file entries.

Figure 3A:
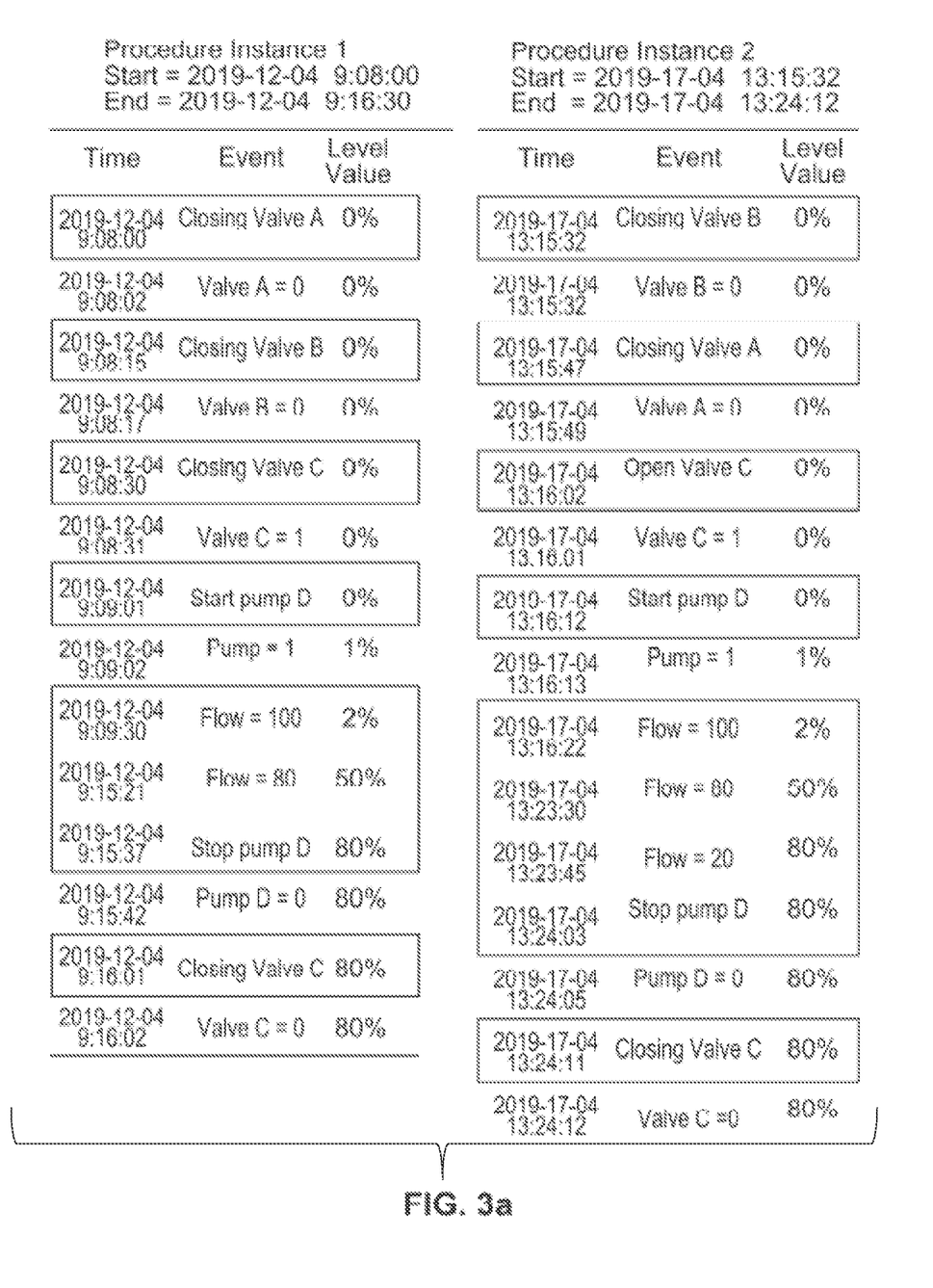
FIG. 3a are exemplary procedure instances, and FIG. 3b are the transformations of the procedures shown in FIG. 3a, in accordance with the disclosure.
Figure 3B:
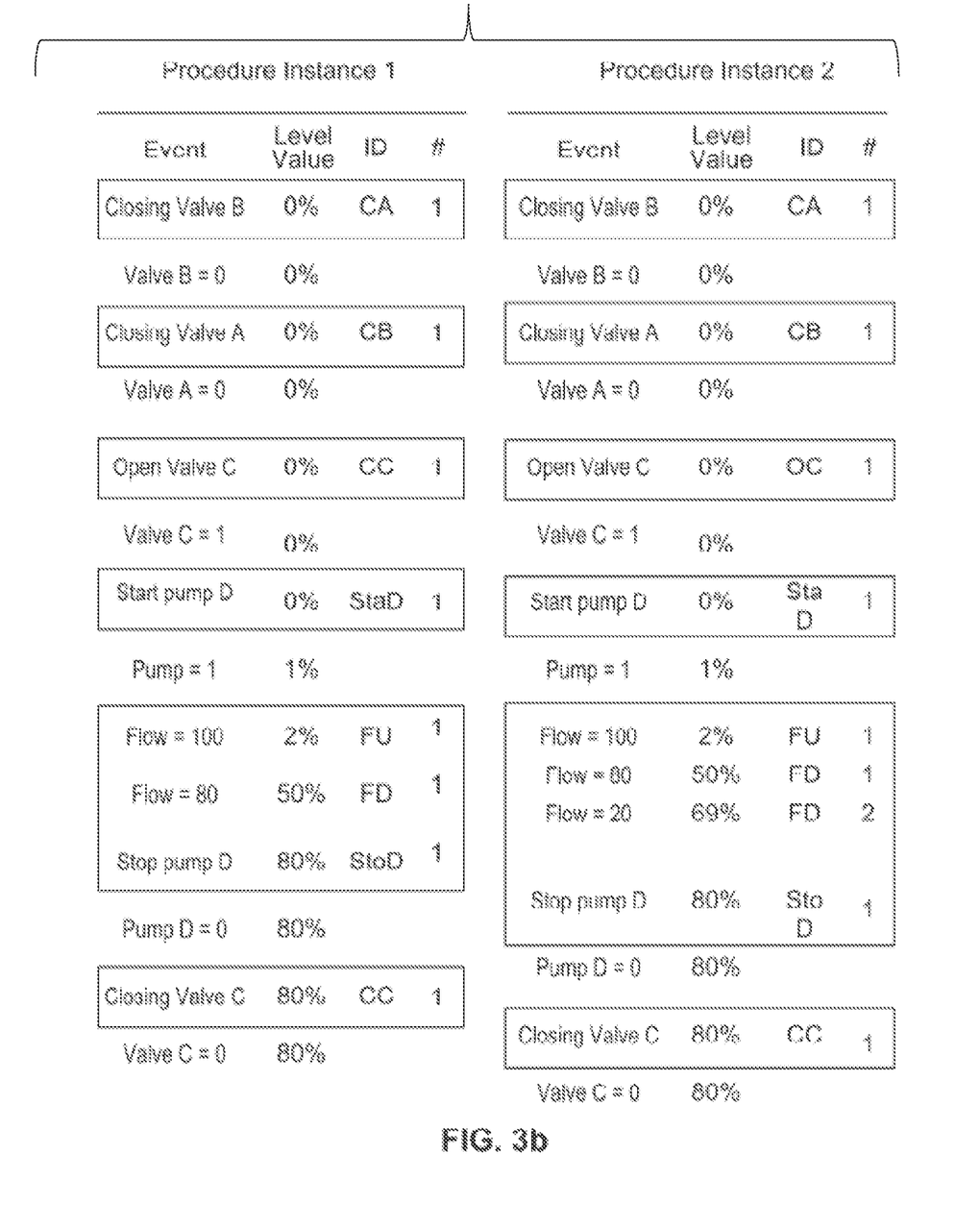

FIG. 3a sketches two examples of manual mode procedure instances originating from related log files or log file events and FIG. 3b an extraction of sequences of manual mode operational actions there from.

For generation of a process model in respect to the described method manual mode procedure instance start times, end times and relevant process variables may be provided from the operational actions as recorded by the historical control system log file. For each corresponding start and end time of the logged action it may be determined whether control loops of the plant process represented by related set points of the plant process are in manual-mode or automatic-mode at the beginning of the procedure instance. This is done iteratively from start of procedure instance towards the end through all log entries.

a) If a set point change is determined as performed in manual mode of the corresponding control loop such operational action will be added to the list of operational actions of the procedure instance including the value of the actual respectively new set point.

b) If a set point automatic (e.g. actuator value within control loop or a target value of a PID controller (proportional-integral-derivative controller) controlled by an advanced process control) was changed to manual mode, such operational action will be added to the list of operational actions of the manual mode procedure instance including the corresponding actual changed value of the set point. If a set point control was changed to auto mode the corresponding set point may be removed from the list of operational actions. That means that any entries that the operator makes for the plant in particular in respect to a manual mode procedure instances are entered to the list.

c) Assign the value of all relevant respectively related process variables at the start of the operational action to the list of operational actions of the procedure instance for determining a range or another statistical property of possible set point settings.

Operational actions may be added from other list as well. Examples of data sources are so called audit trails that collect operator actions on a more detailed level in particular recorded in user interfaces of distributed control systems or operational actions may be extracted from set point signals, adding an operational action to the list of the procedure instance whenever the value of a set point changes.

The operational actions from the different sources will be merged according to the order related to the respective time-stamps.

This steps result in several lists of related sequences of operational actions as identified during the execution of the procedure alongside with values of process variables. FIG. 3a sketches two examples of two such operational actions list with relevant process values which together form two examples of procedure instance.

FIG. 3b sketches how to process a plurality of procedure instances in order to extract the sequential order for determining a partial order graph for each time stamp of operational actions. Next for each operational action within the sequential order of operational actions an identifier ID and an order number (#) is assigned that captures how often a specific set point change was performed having a specified direction of change. By this the sequential order of operational actions of procedure instances are determined to create a partial order process graph. The partial order process graph captures the identified sequential order respectively relationship of manual operational actions as required by the manual mode procedure instance. This results in a directed acyclic graph (DAG) of operator actions.

The identifier (ID) establishes an unique label for an operational action (e.g. ID of the valve the operator manipulates, the pump the operator starts, etc.), which may correspond to a control loop, within the plurality of procedure instances and the identifier may be linked with a number indicating a recurrence of the same operational action within an individual procedure instance.

For generation of a process model using a directed acyclic graph (DAG) of operator actions for each of the manual mode operational actions of the plurality of related sequences of manual mode operational actions it may be determined:

whether the set point change is performed for the first time to initialize a counter number (e.g. with 1 or 0) and assign this counter number for instance as a prefix or postfix to this operational action as shown in FIG. 3b.

If a related set point change already appeared previously, the counter number is increased and correspondingly assigned as prefix or postfix to the corresponding operational action.

As example shown in FIG. 3a there is the procedure instance 2 wherein the flow is decreased two times. To distinguish these two operational actions, there are assigned the counter numbers 1 and 2 respectively. A direction of change of a set point change may be recorded and also linked to the operational action (e.g. lowering vs. increasing a set point like a fluid flow or temperature change or starting or stopping of equipment like a motor or a pump). In the example shown in FIG. 3a, the identifier includes the direction of change (closing, opening, increasing (U for up in the example), or decreasing (D for down in the examples).

Operational actions that do not occur in all of the plurality of recorded procedure instances or only in very few (based on percentage threshold) of the plurality of recorded procedure instances are removed from the list of operational actions of the procedure instances for modeling the process.

The same holds true if the variance of a process value at time of execution of an action is above a threshold value, in such a case the process value might be omitted for this step.

Figure 4A:
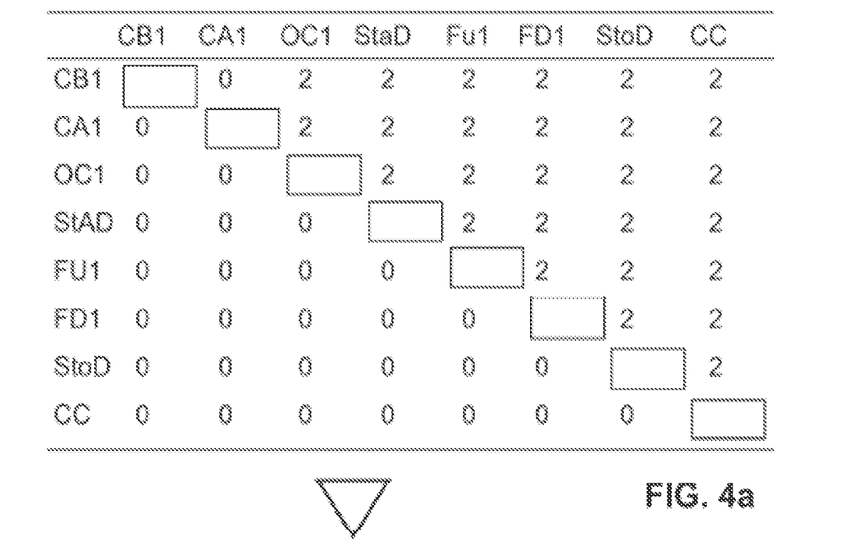
FIG. 4a is a matrix of the procedures shown in FIG. 3a, and FIG. 4b is a flowchart of the resulting process model, in accordance with the disclosure.

For generation of the directed acyclic graph (DAG) by means of the list of sequences of manual operational actions of the procedure instances a specific matrix is created indicating the order of manual operational actions within the list of sequences of manual operational actions as shown in FIG. 4a. The numbers shown at the grid position of the matrix capture how often the operational action indicated in the first column i.e. the respective label of the matrix preceded the operational action indicated in the first row of the label of the matrix.

Some of the operational actions may change their place within the sequential order without technical effect to the manual mode procedure instance. If the numbers in the grid of the matrix suggest a predecessor relationship with arbitrary sequence order for two operational actions A and B (that is both values [A->B]>0 and [B->A]>0 are valid, which is the case for CB1 and CA1 in the example) the numbers of the grid at the respective position of the matrix may be chosen or changed the following way:
(a) it may be chosen to be 0 for both indicated directions of order or (b) a smaller number of the two numbers within the grid, which may result from a threshold difference or just a randomly chosen number of the two numbers (e.g. in case the number are equal) may be set to 0.

Using the matrix, the DAG and the corresponding process model is generated. The following steps are executed until the matrix (or list of nodes in a directed graph) is worked through:
1) Search for columns that contain no values>0
2) Add the corresponding operational action to the DAG/Process Model by creating an edge between the new operational action and the action(s) last added to the graph—if any.
3) Set the number in the row of the great of the matrix corresponding to the operational action added to the DAG/Process model to 0.

Figure 4B:
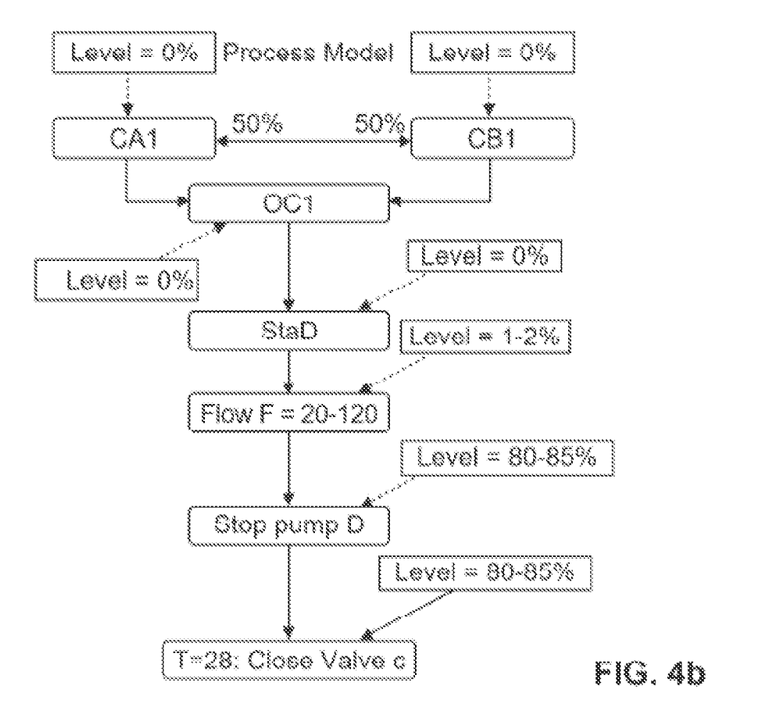

FIG. 4b gives an example of a built DAG. This process model includes the assigned ranges of process values to the operational actions which are sequentially ordered corresponding to the process model. Alternative the procedure to create such a flowchart can be constructed respectively for any other graph representation other than a matrix as for instance using an adjacency list.

For annotation of the operational actions of the flowchart (DAG) respectively the process model with process value ranges, the method extracts the range of process values (min and max) at the time of execution of the recorded individual operational action. Alternatively, the procedure determines a confidence interval for the respective values of the process variables (in 90% of the cases, the values of the process variables were between value A and value B when the step was executed)

The assigned ranges of process values or other statistical properties of the process values for recommendation to change a set point can be learned using a machine learning model, as for instance a regression that estimates a recommended set point change depending on the relevant respectively related process values or all process values of the plant and/or plant section. Alternatively a confidence interval derived from the recorded set point changes (e.g., for 90% of the cases, the operators chose a set point value between A and B) or a machine learning model is trained to correlate set point values with a key performance indicator (KPI) as e.g. an execution time, a quality measure, a throughput, etc.

The order of the described procedures generate the flowchart (DAG) may be modified.

The method for generating a process model may include that operators add annotations during the execution and recording of a manual operational action e.g. by voice recording: 'Precondition for the next set point change opening the valve C is a value of level of X'. Such annotated actions and/or precondition which may be added to the process model may define a required precondition in addition to or alternatively to a value of a process variable of the process model.

The method for generating a process model may include a procedure for editing of an initial process model including:
removing of operational actions;
adding operational actions, that are recorded by the logging system (e.g. checking external data or interaction with field operator);
defining of maximal and minimal values for the set points or defining a formula to calculate the set point values;
selecting values of process variables relevant as precondition of an operational action and specifying upper and lower limits of values of process variables.

The method for generating a process model may include that limits for process variables and set points are extracted from documents by text mining including operational actions and values for set point changes and process variables. Additionally or alternatively this may be done automatically.

A procedure execution support system may record how the operator performs the procedure.

The procedure execution system also 'walks' the operator through steps of the procedure and informs the operator whether preconditions to run the next manual operational action are met or not and which set point the operator should change including a recommended specific value. If the procedure execution system used as assistance is integrated with the operator interfaces of the process control system, manual operational actions that are not included in the process model at all can be prevented from execution. ('Are you sure you want to . . . ?)

Figure 5:
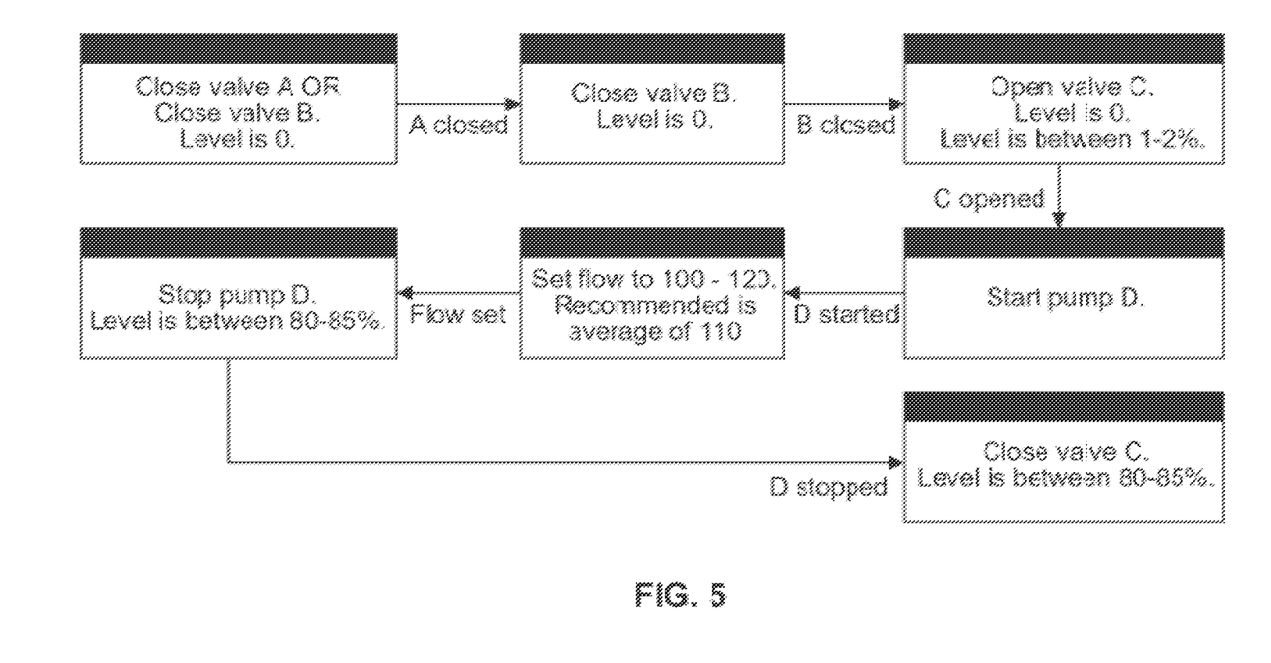
FIG. 5 is a block diagram of a consecutive display content to support running the manual mode process instance, in accordance with the disclosure.

Such a procedure execution support system may display this manual mode procedure instance on a screen with the manual mode operational action as shown e.g. with respect to the dialog flow shown in FIG. 5. After start of the procedure instance, the procedure execution system displays all operational actions without a predecessor including the minimal and maximal process values for its execution. After execution of a manual operational action, the respective operational action and the corresponding edges of the model are removed from the display and the next actions that may be executed (e.g. do not have a predecessor) are added to the display The management of the open manual operational actions may be implemented in different ways (working on a copy of the process model and deleting rows of executed actions or counting until all predecessors are executed, maintaining a list of predecessors and updating this list by deleting executed actions etc.)

The workflow of the procedure execution support system may be automatically triggered (e.g. when the operator performs the first or the first two actions): 'Are you currently performing procedure X?'

The time elapsed between operational actions may be monitored by the procedure execution support system and compared to logged historical values in order to remind an operator to perform and expected next operational action.

The procedure execution support system may be configured to support an operator training including a simulation of a plant process, which is able, e.g., by machine learning, to simulate relationships between set point changes and process variables. For instance it could be simulated and trained what happens if a valve is opened at a lower tank level.

Operational actions are for instance set point changes and can be derived from the operational action sequences directly. Set points are usually recorded as time-series. If the event log does not contain the set point changes directly, they can be derived from the time-series data. Whenever the time-series changes and the set point is not controlled by a model-predictive controller at the time this corresponds to an operator action.

A process model extractor can be built performing the described method that analysis log files and generates a processes model with partial order graphs of actions and using a user provided list of relevant process variables to create pre-condition of operator actions. By this the method can be seen as the at least semi-automatic generation of process models for operational procedures by extraction of process models from the control system log files.

Advantageously by this method know how which is generated by manual operational actions of an operator can be derived and summarized by the process model.

The term set point includes any input to the plant or to a plant section respectively to the control loop controlling the process value of the plant, that means the term set point includes a controller set point and/or actuating values, as e.g. valve settings.

According to an aspect the filtering of the plurality of related sequences of manual mode operational actions is performed according to an individual plant condition.

By this additional filtering in respect to individual plant condition more details of the know-how can be included to the process model.

According to an aspect the individual plant condition is determined by at least a threshold value of a related process variable at the beginning of the manual mode procedure instance.

For an identification of the individual plant condition threshold values of process variables which are related to the individual manual mode procedure instance may be used to get a more detailed insight of the related know-how of manual mode procedure instances.

Describe with other words a procedure instance for which at the start time the same threshold values are reached and/or are within a specified range characterized by threshold values may build one group of manual mode procedure instances.

This aspect of the described method is particularly relevant when the exact course of operational actions depend on the specific nature of the plant situation. This threshold values may be defined by plant experts.

For this approach, the plant expert would define a number of threshold values for signals respectively process variables, as e.g. defining a threshold value for the temperature to be T1245>100°, pressure P3214<30 bar, . . . before starting the manual mode procedure instance. For each procedure instance these threshold values will be checked at the start time of the procedure instance.

According to an aspect the individual plant condition is determined by threshold values of a subset of the related process variables at the beginning of the manual mode procedure instance.

Advantageously there may be individual plant conditions characterized by a subset of the related process value for more detailed characterizing the plant condition.

According to an aspect the individual plant condition is determined by at least one time series of values of related process variables of the plant section within a time period before the start of the manual mode procedure instance.

Advantageously there may be individual plant conditions characterized by at least one time serious of values of related process variables for more detailed characterizing the plant condition. That means by the time serious the history of the plant process might be relevant to run the manual mode procedure instance.

According to an aspect the individual plant condition is determined by a clustered number of time series of values of process variables of the plant section within a time period before the start of the manual mode procedure instance, wherein the cluster is built by scoring similarities of time series of values of related process variables.

By clustering of time series with e.g. methods from unsupervised machine learning, like k-means, dbscan, agglomerative clustering, mean-shift clustering, or others advantageously the precondition for the manual mode procedure instance may be characterized in a very specific way and by this the process model may be more precise reflecting operator know-how. Scoring similarities may be measured by minimal distances or another similarity measure of the time series of values of related process variables involved.

This clustering may also be performed with a the subset of time series of values of related process variables either pre-selected by a plant expert or defined by filtering out signals with low information content, e.g. measured by information entropy.

The scoring of a similarity of at least one plant condition is done by means of calculating a Euclidean distance and/or Dynamic Time Warping and/or Cosine Similarity and/or Levenshtein Similarity after a Piecewise Aggregate Approximation or Symbolic Aggregate Approximation and/or Chebyshev distance of characteristics of the manual operational actions of the respective manual mode procedure instances.

According to an aspect the individual plant condition is determined by values of process variables and/or values of set points and/or a plant section of the manual operational action and/or values of set points and/or number of manual operational actions of the manual mode procedure instances.

By this more specific know-how of the operator can be integrated to the process model.

According to an aspect annotations related to a manual mode operational action is assigned to the respective manual mode operational action.

These annotations may later on help running manual mode procedure instances by the operator taking into account the annotations.

According to an aspect a manual mode operational action with an assigned statistical property of the values of the related process variables is above a limit value is omitted from the process model.

By this aspect of the method untypical process variations do not disturb the design of the correct process model.

According to an aspect of the present invention a specific manual mode operational action of the plurality of related sequences of manual mode operational actions, which rarely occurs within the plurality of related sequences of manual mode operational actions, is omitted from the process model.

The term rarely occurring may be understand as a pre-defined lower limit of a relative rate of occurrence within all sequences of manual mode operational actions taken into account to generate the process model.

This helps to improve the process model and collecting the know-how of the operator by not taking into account operational actions which may not be relevant.

A method according to one of the preceding claims is provided to generate a recommended set point for a manual mode operation action of a manual mode procedure instance, wherein the recommended set point is determined using a machine learning model by means of the plurality of related set points related to an individual plant condition, to be assigned to the related manual mode operational action in respect to the individual plant condition.

Using machine learning for recommendation of set point values to be changed may improve the usage of the process model for the manual mode procedure instance run by the operator giving a precise recommendation in contrast to just a range of possible values for the set point change.

A method for generation of a warning signal related to a plant process is provided, including the following steps. In a step of the method continuously log events of the plant process are provided. In a further step an individual plant condition is determined by means of log events of the plant process as described above. In a further step the warning signal is generated based on the individual plant condition fitting the process model according to the preceding claims.

Such a warning signal may indicate to an operator to start a manual mode procedure instance of related a plant process.

By monitoring operator actions which are compared to the process model enables to detect the start of relevant procedures for the plant and to warn the operator to start the manual mode process instance.

A support system comprising a controller is provided, which is configured to support an operator performing the manual mode operational actions according a process model generated according to the method as described above, by displaying related process values and/or recommending set point changes to the operator according to the manual mode operational action sequences as resulting from the process model.

Such a support system may support and monitor the execution of the manual mode process instance by using the process model at runtime to guide the operator through the manual mode process instance and monitor its execution.

By creation of a process model as described using the simple waterfall process model and a dialog system that is capable of interpreting the waterfall process model and at the same time monitor the condition in the process plant, map them on pre-conditions of the process steps, notify the operator when pre-conditions are met, warn the operator when he takes actions that are not part of the process or take actions which preconditions are not yet met, and monitor and create a protocol of the specific execution of procedure.

With other words a monitoring using the described process model during execution of operational procedures may automatic trigger manual mode operational actions using the know-how of former observed operator actions to avoid that operators perform actions without support of the system.

According to an aspect the support system comprises a process model editor, which enables an operator to fine tune the process model for instance by using a dialog based or wizard like system external to the actual control system.

A use of the process model generated according to the method as described above is provided to support an operator performing the manual mode operational actions of a manual mode procedure instance.

According to another aspect a computer program comprising instructions is disclosed, which, when the program is executed by a computer, cause the computer to carry out the one of the described methods.

According to another aspect of the present invention a computer-readable storage medium is disclosed on which the computer program is stored.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating a process model modeling a manual mode procedure instance of a plant process, the procedure instance comprising a related sequence of operational actions, including the steps of:
- providing a plurality of log events of a plurality of operational actions of the plant process;
- selecting a plurality of related sequences of manual mode operational actions from the plurality of log events;
- filtering the plurality of related sequences of manual mode operational actions according to an individual plant section;
- identifying a sequential order from the plurality of filtered related sequences of the manual mode operational actions;
- determining statistical properties of values of related process variables and/or statistical properties of values of related set point changes to each sequential ordered manual mode operational action from the plurality of filtered related sequences of the manual mode operational actions;
- generating the process model of the manual mode procedure instance by arranging related manual mode operational actions with the sequential order of each operational action assigned with the statistical properties of the values of related process variables and/or assigned with the statistical properties of the values of the related set point changes,
- wherein the process model is configured to provide guidance through execution of corresponding manual procedures using the generated process model.

2. The method according to claim 1, wherein the filtering of the plurality of related sequences of manual mode operational actions is performed according to an individual plant condition.

3. The method according to claim 2, wherein the individual plant condition is determined by at least a threshold value of a related process variable at the beginning of the manual mode procedure instance.

4. The method according to claim 3, wherein the individual plant condition is determined by threshold values of a subset of the related process variables at the beginning of the manual mode procedure instance.

5. The method according to claim 2, wherein the individual plant condition is determined by at least one time series of values of related process variables of the plant section within a time period before the start of the manual mode procedure instance.

6. The method according to claim 2, wherein the individual plant condition is determined by a clustered number of time series of values of process variables of the plant section within a time period before the start of the manual mode procedure instance, wherein the cluster is built by scoring similarities of time series of values of related process variables.

7. The method according to claim 1, wherein annotations related to a manual mode operational action is assigned to the respective manual mode operational action.

8. The method according to claim 1, wherein a manual mode operational action with an assigned statistical property of the values of the related process variables is above a limit value is omitted from the process model.

9. The method according to claim 1, wherein a specific manual mode operational action of the plurality of related sequences of manual mode operational actions, which rarely occurs within the plurality of related sequences of manual mode operational actions, is omitted from the process model.

10. The method according to claim 1, further comprising generating a recommended set point for a manual mode operational action of a manual mode procedure instance, wherein the recommended set point is determined using a machine learning model by means of the plurality of related set points related to an individual plant condition, to be assigned to the related manual mode operational action in respect to the individual plant condition.

11. The method according to claim 1, further comprising monitoring a compliance of the execution of the corresponding manual procedures with a set of related rules specified by the process model.

* * * * *